(12) United States Patent
Gillespie et al.

(10) Patent No.: US 10,174,266 B2
(45) Date of Patent: Jan. 8, 2019

(54) METHOD OF SYNTHETIC FUEL GAS PRODUCTION

(71) Applicant: Sustainable Waste Power Systems, Inc., Kingston, NY (US)

(72) Inventors: Michael Joseph Gillespie, Shohola, PA (US); Christopher Paul Gillespie, Ridgefield, CT (US); Joseph J. Zambito, Bronx, NY (US)

(73) Assignee: SUSTAINABLE WASTE POWER SYSTEMS, INC., Kingston, NY (US)

( * ) Notice: Subject to any disclaimer, the term of this patent is extended or adjusted under 35 U.S.C. 154(b) by 0 days.

(21) Appl. No.: 15/329,303

(22) PCT Filed: Jul. 28, 2015

(86) PCT No.: PCT/US2015/042330
§ 371 (c)(1),
(2) Date: Jan. 26, 2017

(87) PCT Pub. No.: WO2016/018836
PCT Pub. Date: Feb. 4, 2016

(65) Prior Publication Data
US 2017/0226436 A1    Aug. 10, 2017

Related U.S. Application Data

(60) Provisional application No. 62/136,825, filed on Mar. 23, 2015, provisional application No. 62/029,691, filed on Jul. 28, 2014.

(51) Int. Cl.
*C10J 3/68* (2006.01)
*C10J 3/66* (2006.01)
(Continued)

(52) U.S. Cl.
CPC ............. *C10J 3/66* (2013.01); *C10J 3/466* (2013.01); *C10J 3/485* (2013.01); *C10L 9/086* (2013.01);
(Continued)

(58) Field of Classification Search
CPC ........ C10J 2300/1662; C10J 2300/0973; C10J 2300/1693; C10J 2300/1646;
(Continued)

(56) References Cited

U.S. PATENT DOCUMENTS

| | | | | |
|---|---|---|---|---|
| 5,603,891 A | * | 2/1997 | Brill | ...................... C22C 19/058 |
| | | | | 420/443 |
| 2004/0182001 A1 | * | 9/2004 | Masemore | ............... C10L 37/10 |
| | | | | 48/197 FM |
| 2014/0178782 A1 | * | 6/2014 | Gillespie | ................... F02C 3/28 |
| | | | | 429/425 |

\* cited by examiner

*Primary Examiner* — Amber R Orlando
*Assistant Examiner* — Syed T Iqbal
(74) *Attorney, Agent, or Firm* — Baker & Hostetler LLP (57) ABSTRACT

The invention concern methods for converting carbonaceous feedstock slurry into synthetic fuel gas comprising: (a) introducing a carbonaceous feed stock slurry into a first reaction vessel via a continuous feed; (b) converting said carbonaceous feed stock slurry to a carbon char slurry comprising carbon char, and water by allowing said carbonaceous feed stock slurry to have a residency time of between 5 and 30 minutes in said first reaction vessel, said carbonaceous feed stock slurry being heated to a temperature of between about 260 to about 320° C. at a pressure such that water does not flash to steam.

50 Claims, 6 Drawing Sheets

(51) Int. Cl.
*C10J 3/48* (2006.01)
*C10J 3/46* (2006.01)
*C10L 9/08* (2006.01)
*C10J 3/74* (2006.01)

(52) U.S. Cl.
CPC ............ *C10J 3/74* (2013.01); *C10J 2300/094* (2013.01); *C10J 2300/0946* (2013.01); *C10J 2300/0959* (2013.01); *C10J 2300/0973* (2013.01); *C10J 2300/0976* (2013.01); *Y02P 20/144* (2015.11)

(58) Field of Classification Search
CPC .................. C10J 2300/1246; C10J 3/00; C10J 2300/0906; C10J 2300/094; C10J 3/723; Y02E 60/526; Y02E 20/18; Y02E 50/12; Y02E 70/20; Y02E /; C10L 3/08; C10L 9/086; H01M 8/04007; H01M 2008/1293; H01M 2008/147; H01M 8/0643; H01M 8/0618; F05D 2220/75; F05D 2220/722; Y02P 20/129; F02B 43/08; F02C 3/28
See application file for complete search history.

METHOD OF SYNTHETIC FUEL GAS PRODUCTION

RELATED APPLICATIONS

The present application is a National Stage Application filed under 35 U.S.C. 371 of International Application No. PCT/US15/42330, filed Jul. 28, 2015 which claims benefit of U.S. Patent Application No. 62/029,691, filed Jul. 28, 2014 and U.S. Patent Application No. 62/136,825, filed Mar. 23, 2015, the disclosures of each are incorporated herein by reference.

TECHNICAL FIELD

The present invention relates generally to gasification systems and related methods that accept a carbonaceous feedstock and produce synthetic fuel gas.

BACKGROUND

Although gasifiers are a long standing technology, they have yet to seriously challenge our use of fossil fuels due to their inherent complicated nature with respect to the processing of feedstock. Because gasification is an inexact science, engineers have been unsuccessful to date in creating a process or product that can be turned over to an operator to be utilized as a predictable machine. Variations in feedstock, even within homogeneous species of feedstocks, yield varying results.

The existing art consists of several styles of gasifiers. Most are of the style that was originally constructed many decades ago in which a bed of feedstock is heated within a vessel, or stages within multiple vessels, where feedstock is subjected to heating at either atmospheric or raised pressure, and is in the presence of steam, oxygen, air, and/or some other gas to provide for a gasification reaction of the feedstock. The gasifier can be directly heated by combustion, which is most common, or indirectly heated by another source.

The original belt type or moving bed gasifier is still in use in some applications, where a dry feedstock is heated while a conveyor belt moves the feedstock through a heating zone. The feedstock breaks down over time, and ash is left over at the end of the machine. Synthetic Natural Gas (syngas) is released and captured within the reactor.

Up flow, down flow, and cross flow gasifiers consist of a large vessel in which the feedstock is carried through a reaction zone by gravity or by motive steam, air, or another fluidizing injection agent. These are typically more efficient, but again require dry feedstock.

Another major type of gasifier is the "tumbler" style gasifier, where a rotating drum rolls feedstock within it to expose the feedstock to a heating medium that is either entrained within, or is applied to the exterior of the tumbling tube. These gasifiers are not very applicable in large scale operations, and require the feedstock to dry out which leads to pyrolysis and gasification.

Yet another method is an entrained flow gasifier, where the feedstock is injected into a vessel, usually with steam or air, but which has also been entrained with hydrogen or inert gases. The flow is entrained with the fluidizing agent, and these are typically heated indirectly. The existing art includes entrained flow gasification where the feedstock is dried prior to entrainment.

Some styles include a devolatilization reactor preceding the gasifier which dries and extracts the light gaseous materials from the feedstock. This stabilizes the reaction by consuming the entrained oxygen prior to gasification to eliminate "run away" reactions where the feedstock material combines with the entrained oxygen and pyrolyzes and creates poor quality syngas.

All of these methods have a single major shortfall, which is that the controllability of their processes is subject to a fixed mechanical dimension, and the ability to change the operating characteristics of these gasifiers is limited by this.

Other methods of handling waste include composting, digestion, incineration, and supercritical water processes. Composting is expensive, has a pollution potential based on runoff, and has long breakdown times for the waste. Incineration is expensive, has high pollution potential and often faces public opposition. Supercritical water processes require equipment suitable for processes that run at over 3,000 psi. The combination of very high pressure and exothermic reactions can be dangerous to operate. In addition, supercritical processes produce hydrogen fuel only as carbon is consumed as $CO_2$.

Accordingly, there is a need in the art for improved gasification systems and related methods that overcome these issues.

SUMMARY

In some embodiments, the invention concerns methods for converting carbonaceous feedstock slurry into synthetic fuel gas comprising:

(a) introducing a carbonaceous feed stock slurry into a first reaction vessel via a continuous feed;

(b) converting said carbonaceous feed stock slurry to a carbon char slurry comprising carbon char, and water by allowing said carbonaceous feed stock slurry to have a residency time of between 5 and 30 minutes in said first reaction vessel, said carbonaceous feed stock slurry being heated to a temperature of between about 260 to about 320° C. at a pressure such that water does not flash to steam, (c) transferring said carbon char slurry comprising carbon char and water from the first reaction vessel to a second reaction vessel which comprises an entrained flow steam reforming gasifier, introducing a pressure decrease with said transferring such that at least a portion of the water flashes to steam to produce a carbon char slurry comprising carbon char and steam, and (d) within said second reaction vessel producing a mixture comprising synthetic fuel gas from said carbon char slurry comprising carbon char and steam, the gasifier producing a process bulk temperature within the gasifier not exceeding 1000° C.

In some methods, the first reaction vessel comprises a process entry point, a process exit point and tubing connecting said process entry point and said process exit point. In some preferred embodiments, the entrained flow steam reforming gasifier is constructed of material comprising nickel.

Any suitable carbonaceous feed stock may be utilized. In certain embodiments, the carbonaceous feed stock entering the second reaction vessel has an average particle size of 2-20 microns. In some preferred embodiments, the carbonaceous feed stock entering the second reaction vessel has an average particle size of 4-15 microns. Preferably, the carbonaceous feed stock in the second reactor undergoes turbulent velocity flow.

Depending on input composition, output desires or regulatory considerations, bulk process temperature may vary to meet desired results. In some embodiments, the process bulk temperature is at least 500, 550, 650 or 850° C.

In certain processes, step (b) is performed at a temperature above 900 psia but does not exceed 1300 psia.

In some processes, the carbonaceous feed stock is derived from one or more of municipal waste, agricultural waste, and food waste. In other embodiments, the carbonaceous feed stock comprises one or more of diapers, food, textiles, wood, yard waste, paper, and plastic.

For certain process, the carbonaceous feed stock comprises contaminated soil. Other processes utilize one or more fossil fuels as the feedstock.

Rubber can be utilized as the carbonaceous feed stock. One source of rubber is tires and debris from tires.

In some embodiments, the carbonaceous feed stock comprises medical waste. In other embodiments, the carbonaceous feed stock comprises hazardous chemical waste.

In certain embodiments, the carbonaceous feed stock comprises contaminated aqueous waste. Some carbonaceous feed stock comprises sewage.

The processes disclosed herein can also be utilized where the carbonaceous feed stock comprises human cadavers.

In yet other embodiments, the carbonaceous feed stock comprise radioactive waste.

In some embodiments, the second reaction vessel additionally produces an ash comprising at least 20 ppm of each of Al, Ba, Ca, Fe, K, Mg, Na, P, S, Si, Ti and Zn. In certain embodiments, the ash additionally comprise at least 5 ppm of each of Cr, Cu, Ni, Sb and Zr.

Another aspect of the invention concerns a process where the methods for converting carbonaceous feedstock slurry into synthetic fuel gas comprise:

(a) introducing a carbonaceous feed stock slurry into a first reaction vessel via a continuous feed;

(b) converting said carbonaceous feed stock slurry to a carbon char slurry comprising carbon char, and water by allowing said carbonaceous feed stock slurry to have a residency time of between 5 and 30 minutes in said first reaction vessel, said carbonaceous feed stock slurry being heated to a temperature of between about 260 to about 320° C. at a pressure such that water does not flash to steam, (c) transferring said carbon char slurry comprising carbon char and water from the first reaction vessel to a second reaction vessel which comprises an entrained flow steam reforming gasifier, introducing a pressure decrease with said transferring such that at least a portion of the water flashes to steam to produce a carbon char slurry comprising carbon char and steam, and (d) within said second reaction vessel producing a mixture comprising synthetic fuel gas from said carbon char slurry comprising carbon char and steam, the gasifier producing a process bulk temperature within the gasifier not exceeding 650° C.

Certain processes of the invention produce at least 40 vol % of $H_2$, about 40 vol % to 60 vol % in some embodiments. Some processes produce 30 vol % or less of $CO_2$, about 15 to about 30 vol % in some embodiments. In some processes, about 5 vol % to about 20 vol % of methane is produced, about 8 vol % to about 20 vol % in certain processes.

DETAILED DESCRIPTION OF ILLUSTRATIVE EMBODIMENTS

The present invention may be understood more readily by reference to the following detailed description taken in connection with the accompanying Figures and Examples, which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to the method of preparing such devices and to the resulting, corresponding physical devices themselves, as well as the referenced and readily apparent applications for such devices.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When values are expressed as approximations, by use of the antecedent "about," it will be understood that the particular value forms another embodiment. In general, use of the term "about" indicates approximations that can vary depending on the desired properties sought to be obtained by the disclosed subject matter and is to be interpreted in the specific context in which it is used, based on its function, and the person skilled in the art will be able to interpret it as such. Where present, all ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, references to values stated in ranges include each and every value within that range.

Generally terms are to be given their plain and ordinary meaning such as understood by those skilled in the art, in the context in which they arise. To avoid any ambiguity, however, several terms are described herein.

Figure 1:
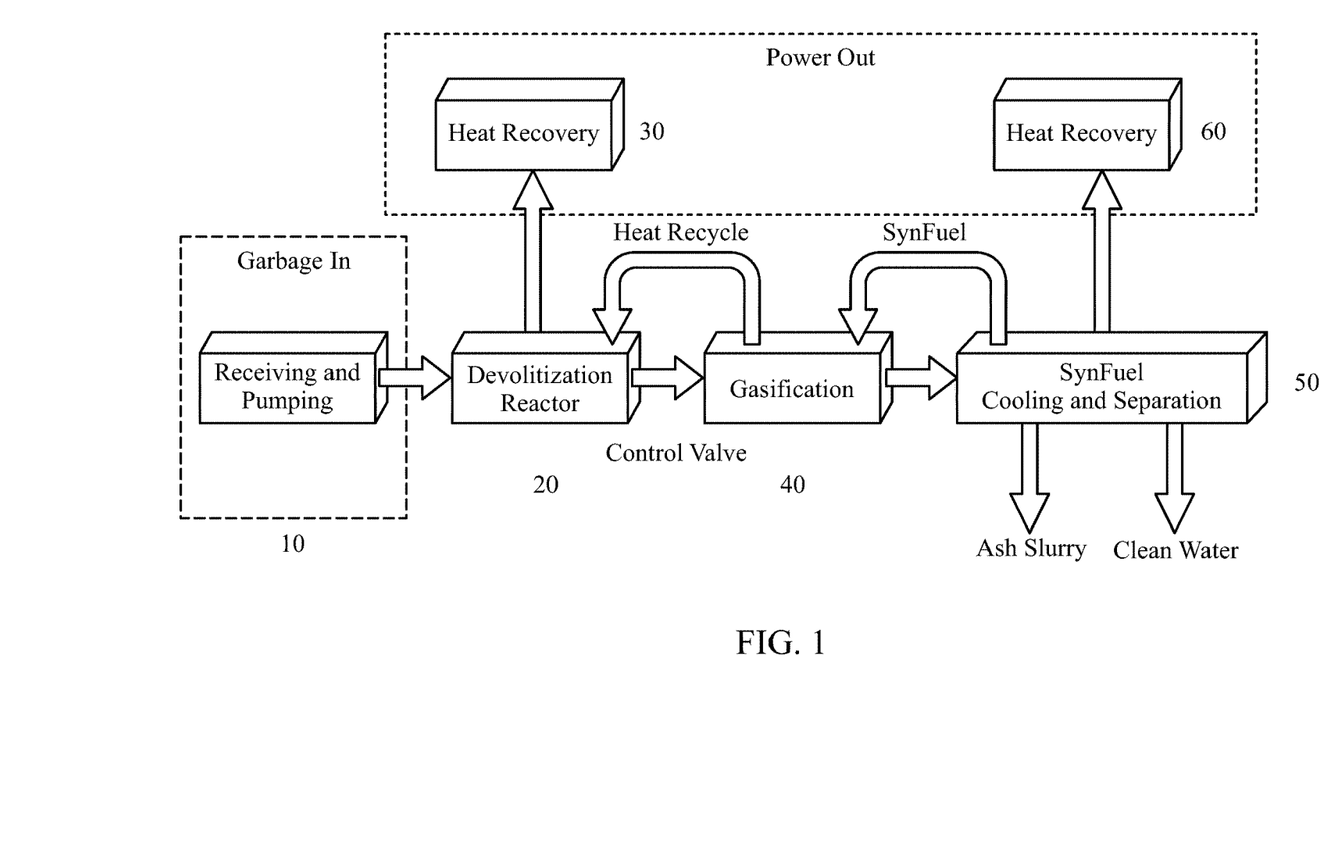
FIG. 1 shows a schematic of an example of an arrangement of process equipment suitable for performing some embodiments of the invention.

FIG. 1 presents a schematic of an example of an arrangement of process equipment suitable for performing some embodiments of the invention. In the schematic, garbage or other feedstock is fed to a devolatilization reactor (DVR) 20 where it is heated under pressure and converted to Bio-Char. Typically the feedstock is fed/injected via a pump from a receiving vesicle 10. Material from the DVR may be fed to a gasifier 40 which converts the bio-char and water into SynFuel, steam, and ash. Material from the gasifier 40 can be fed to a synfuel cooling and separation system 50 where the synfuel is separated from the ash and water and cooled. Heat recovery units 30 and 60 can be utilized to recover heat from the DVR and synfuel cooling and separation device 50 and used for other applications. Ash can be collected and beneficially utilized (fertilizer, for example) or discarded.

The current process has a number of advantages versus presently known processes. It can be run such that a portion of the produced fuel gas is not cannibalized to drive the process. This operation can be advantageous from a pollution standpoint.

Water is entrained in all feedstock in various ratios. In conventional combustion or dry gasification processes, this water must be evaporated which results in a significant energy loss. The inventive process does not evaporate or extract the water from the process flow.

In addition, the process can utilize an entrained flow auto air pollution control mechanism which auto scrubs the produced gas of any harmful or hazardous material, which is instead found in the ash slurry. The pulverizing action through flashing produced a very fine ash, 4 to 15 microns.

In addition, essentially no tar production in seen with continuous feed operation. Greater than 98% of the carbon-based convertible waste can be converted to fuel gas in prototype scale with production of hydrogen rich fuel gas (48.7% mole basis) at lower than expected temperature (below 1,200° F.).

As used herein, the term "feedstock" generally means any energy-bearing material that may be fed into a system for processing purposes. Hence, the output of one system may serve as the feedstock input material for another system.

The instant synthetic gas production process may process any type of carbonaceous feedstock, utilizing similarly physically designed reactor systems for any given feedstock. The systems are modular such that they can be tuned in terms of capacity and reaction parameters. While any suitable carbonaceous feedstock may be used, examples of such feed stocks include municipal waste, farm waste, food processing waste and industrial waste.

"Carbon char" is the residue produced by the incomplete combustion of a hydrocarbon.

"Entrained flow steam reforming gasifiers" are reactors were pulverized or atomized hydrocarbons are reacted with oxygen and steam to produce gaseous fuel. Such reactors are known to those in the art.

"Process Bulk Temperature" is the mean aggregate temperature of the flow, after it has been heated, as it leaves the gasifier of the instant process.

"SynFuel" is liquid or gaseous fuel manufactured from a carbonaceous feed stock such as coal, oil extracted from shale or tar sands or organic based feedstocks described herein. In the present invention, the synfuel is preferably gaseous. In some embodiments, the synfuel comprises hydrogen ($H_2$) as well as low molecular weight hydrocarbons such as $CH_4$.

Municipal waste is a mixed waste stream comprising one or more of diapers, food, textiles, wood, yard waste, paper, and plastic.

Paper in the mixed waste stream comprising one or more of beverage cartons, newspaper, cardboard, Kraft paper, printer and copy paper, books, and magazines.

Plastics in the mixed waste stream comprises one or more plastics. In some embodiments, the plastics comprise one or more of plastic #1: polyethylene terephthalate (PET or PETE), plastic #2: high density polyethylene (HDPE), plastic #3: polyvinyl chloride (PVC), plastic #4: low density polyethylene (LDPE); plastic #5: polypropylene (PP), plastic #6: polystyrene (PS), and plastic #7: other. In some embodiments, the plastic comprises one of more of HDPE bottles and PET bottles. In certain embodiments, the plastic is in the form of a film. In some embodiments, the plastic is in the form of a food container.

Yard waste can comprise one or more of grass clippings, leaves, and wood.

Textiles can comprise woven and non-woven fabrics. Examples of textiles include discarded clothing, furnishings (including upholstery), rugs and carpet, towels, coverings for beds (including bed linens), tables and the like, and other articles comprising woven and non-woven fibers (including backpacks, flags, and umbrellas).

Agricultural waste comprises one or more of animal waste (including manure, dead bodies and animal slaughter waste products), field waste (including weeds, plants and straws) and agro-industrial waste (including debris from grains (including corn and wheat), molasses, sugar cane, and fruit and vegetable peals, and other vegetable and fruit waste.

Food waste includes debris from one or more of meat, vegetables, fruit, breads, beverages, bakery goods and the like.

Contaminated soil is soil that contains one or more of petroleum, chemical or other carbonaceous s waste.

Medical waste comprises one or more plastics (such as syringes, tubing and the like), fabric (such as dressings and bandages), radioactive materials, chemicals and bodily fluids and other carbonaceous waste material produced in a medical setting.

Hazardous chemical waste comprises one or more of commercial chemical byproducts, discarded chemicals such as insecticides, cleaners, paints, oils, lubricants, radioactive waste, nuclear waste, and other commercial and residential hazardous chemical wastes.

Fossil fuels include propane, natural gas, and other petroleum fuel products.

Contaminated aqueous waste includes polluted water, animal manure mixtures and other contaminated aqueous solutions or slurries. In some embodiments, the aqueous waste may be concentrated to contain 85% or less of water.

Sewage may comprise one or more of material removed from a septic system or municipal sewage stream or other streams containing sewage.

Human cadavers include human bodies and parts thereof. Processes include cremation processes.

A feedstock slurry can be prepared from carbonaceous feedstock. In some preferred embodiments, the feedstock slurry comprises between 40% and 85% water, 40-80% water 60-85% water in some embodiments. The percents are based on mass of the constituents of the feedstock. Advantageously, raw material can typically be accepted as-is without expenditure of drying energy. No separation of solids or liquids from stream is needed.

The invention can utilize feedstock metering to introduce feedstock into the devolatilization reactor (DVR). In some embodiments each feedstock metering device includes at least one of a block valve and a metering valve. In preferred embodiments the heating fluid metering device is an air damper. Feedstock may be held in a tank prior to entry into the DVR.

The invention can offer pressurized devolitilization with no drying or flashing of water to steam. The invention can utilize a sub-saturated water state and avoid the need for super-critical water. In some embodiments, the process has about 20 min process residency time—about 5-30 minutes in some embodiments. The process that converts the waste slurry to the char/volatile/water mixture may be endo- or exo-thermic.

A control valve between the DVR and the gasifier can be used to control flashing from DVR to gasifier. For example, 38% flash was observed at 1200 psi and 550° F. Resulting pulverization by passage through the valve produces max reaction surface area with a 4-15 micron particle size. In addition, flow speed increases dramatically—steam is 14× volume of water.

In some embodiments, the gasifier constructed material that comprises one or both of T316L or T310 stainless steel. In certain embodiments, the gasifier operates at near-atmospheric pressure and a bulk fluid flow temperature of between 600 and 1200° F. The process provides gasification occurring on materials yielding an unusually high hydrogen fraction and very high material conversion rates.

The gasification process can use an indirectly heated process flow. No matrices/extended surfaces are required for catalyst of any kind. The process can utilize a short residency time with high temperature gain. The process can utilize high velocity with fully turbulent flow. Importantly, the process makes use of essentially 100% of both fixed and volatile carbon. Operating temperatures can be adjusted as a function of the feedstock. Typically, a high hydrogen fraction is produce in the syngas—typically around 50%. The process does not require air injection and produces little if any tar, dioxin or furan.

The synfuel cooling and separation device may be a single pass, multi-stage cooler/condenser. Stages of cooling allow for high grade heat recovery. Ash captured from the process is fully contained and treatable.

EXAMPLES

Example 1

A two reactor system was used for conversion of waste to SynFuel. The system has a first reactor (DVR) that has an input of carbonaceous feed stock slurry for conversion to a carbon char slurry comprising carbon char, and water. The reactor allows the carbonaceous feed stock slurry to have a residency time of between 5 and 30 minutes within the reactor. The pressure in the DVR was successfully maintained at between 900 and 1300 psi. The DVR heating medium temperature works between 600 and 500° F. It was noted that below 500° F., the process fails and "smoke" is produced out of the gasifier instead of SynFuel. Above 500° F., we generate clean SynFuel. The DVR process outlet temperature maintains between 550 and 450° F. while operating for clean SynFuel.

For this example, the DVR is constructed of T316 stainless steel.

Using pulverizing action of the control valve yielded an ash particle size of between 4 and 15 microns. The material admitted was coarsely ground in a blender as a slurry without any size screening. Lab analysis of ash confirmed this result.

During operation, significant flashing action and velocity directly out of the control valve were observed.

The gasifier was operated up to bulk temperatures in the 900° F. to 1600° F. range. In some embodiments, the gasifier coil metal comprised T316L or T310—both composition containing nickel. The gas results indicate significant hydrogen production, indicating increased reaction rates and/or initialization temperature in the gasifier.

The conversion of material was 98% of convertible content (volatiles+fixed carbon). Thermographic lab analysis of the ash showed a very small percentage of carbon remaining in addition to the ash. In one case, 50 mole % of the syngas was found to be $H_2$. In another case, a good mixture of hydrocarbons was observed.

Example 2

Two gas sample bags derived from a synthetic medical waste stream (MSW) were submitted for chemical characterization along with the waste feed slurry tested for heating value, and an ash suspension which was analyzed for particle size and shape and elemental composition. Gas chromatography performed under various conditions and with various detectors was used to assay the permanent gases, hydrocarbons and other volatile compounds while microscopy was employed to examine residual ash. Slurries of the starting materials were assayed by bomb calorimetry to determine the heat of combustion of the dried solids.

The feedstock composition was provided by the client and is shown in Table II. These solids were prepared as an aqueous slurry so the solids were isolated and dried for testing. To determine the heating value of the solids, the heat of combustion was measured using a Parr Adiabatic calorimeter with a double valve bomb. 0.5 to 1.0 g of dried solids were placed in the high-pressure steel bomb pressurized with 35 atm of oxygen. The bomb was submerged in an insulated well stirred container of water in an adiabatic calorimeter. Ignition was achieved using an incandescent iron wire. The temperature of the water was recorded prior to, during, and after ignition. The resulting change in temperature due to combustion of the fuse and sample is proportional to the heat of combustion of the sample and the calorimeter constant. The calorimeter constant was determined using a benzoic acid standard. Additional corrections were made, one for the heat contributed by the burning fuse, one for formation of sulfuric acid and one for formation of nitric acid. From the measured sample weight, the measured temperature rise, the fuse correction, the sulfuric acid correction, nitric acid correction and the calorimeter constant, the heat of combustion was determined.

Elemental analysis was performed on a digest of these solids using inductively coupled plasma optical emission spectroscopy (ICP-OES, Perkin-Elmer 3300DV). Approximately 6 g of material was dried in an oven then mixed with concentrated HCl to dissolve. The metals were quantified on the dry basis of the solids.

From this feedstock, gases were obtained which were analyzed by gas chromatography. Permanent gases and other small molecules such as CO and CH4 were determined by GC-TCD (HP5890A, Supelco Carboxen 1000). The gas was sampled with gas-tight syringes and injected into the GC system. Chromatograms were compared to standard gas mixtures (Scott Gas Mix #501697, Scott Gas Mix #501662) to identify the components based on retention time and quantify the various gases in the mixture. To quantify hydrogen in the samples, the carrier gas in the GC-TCD was changed to argon (Ar) from helium (He) to improve sensitivity of the thermal conductivity detector to hydrogen ($H_2$).

Other volatile gas components (>C4) were investigated by GC-MS (Shimadzu QP2010S). The gas was injected onto a ZB-624 column and detected with a mass spectrometer set to scan from 45-500 m/z. Observed peaks were identified by spectral matching of the mass spectra compared to library spectra (NIST, Wiley).

A Leica MZ12 stereo zoom microscope was used to examine the samples for image analysis. A drop of sample was placed on a microscope slide then a cover slip was placed over the liquid. Images were collected and archived using a JVC 3-CCD digital camera and PVR Plus software. Image J software (version 1.46 p) was used to analyze size and shape distributions of the samples. The images, collected at 270× magnification, were converted to the binary format to provide suitable brightness to contrast ratios.

Because of the limited amount of ash available, elemental composition was obtained using energy dispersive x-ray (EDX) spectrometry in a scanning electron microscope. A small amount of dried ash was placed on an SEM mount topped with conductive carbon tab. The elemental profile and secondary electron images were determined at 20 kV using a JEOL JSM-6010LA scanning electron microscope equipped with a silicon-drift digital x-ray detector to collect the x-ray data. After the EDX was collected, the sample was made conductive by sputter coating the sample with gold using a Cressington 108 Auto Sputter Coater. JEOL "In Touch Scope" software was used to collect and archive the resulting spectrum and images.

Differential scanning calorimetry and thermal gravimetric analysis (DSC-TGA) scans were collected simultaneously on a TA Instruments SDT-2960 in a flowing stream of air.

TABLE 1

Feed stock slurry composition

| Material Group | Material Subgroup | % MSW | % Org | Oz |
|---|---|---|---|---|
| Organics | Diapers/Hygiene | 3.2% | 3.9% | 5 |
| | Food | 17.7% | 21.4% | 28 |
| | Misc. Organic | 5.7% | 6.9% | 9 |
| | Textiles | 6.7% | 8.1% | 11 |
| | Wood | 1.5% | 1.8% | 3 |
| | Yard | 4.1% | 4.9% | 7 |
| | Organics Total | 38.9% | 46.9% | 63 |
| Paper | Bev Cartons | 0.5% | 0.6% | 1 |
| | Compostable Paper | 6.1% | 7.3% | 10 |
| | Mixed Paper | 12.8% | 15.4% | 20 |
| | Other Paper | 0.7% | 0.8% | 2 |
| | ONP - Newspaper | 7.5% | 9.1% | 12 |
| | OCC - Kraft Paper | 2.4% | 2.9% | 4 |
| | Paper Total | 30.0% | 36.2% | 49 |
| Plastic | Film | 7.5% | 9.0% | 12 |
| | HDPE Bottles | 0.9% | 1.1% | 2 |
| | Injection Molded Tubs | 0.1% | 0.1% | 1 |
| | Other Plastic Products | 2.4% | 2.5% | 4 |
| | Other Rigid Containers/Packaging | 1.5% | 1.9% | 3 |
| | PET Bottles | 1.2% | 1.5% | 2 |
| | #3 PVC | 0.0% | 0.0% | 1 |
| | #4 LDPE | 0.0% | 0.0% | 1 |
| | #5 PP | 0.2% | 0.2% | 1 |
| | #7 Other | 0.1% | 0.1% | 1 |
| | Plastic Total | 13.9% | 16.8% | 28 |
| | Grand Total | 82.9% | | 128 |

Based on these experiments, the heat of combustion for the solids in the MSW slurry was 7,886 Btu/lb.

The elemental composition of the feedstock (Table V) showed that it contained high (>100 ppm) levels of Al, Ba, Ca, Fe, K, Mg, Na, P, S, Si, and Ti but most other metals were much lower or below the instrument detection limit. Three metals may be of concern in this feedstock: chromium (Cr), antimony (Sb), and strontium (Sr) and could be investigated in the ash if additional quantities can be collected.

Chemical components in the gas derived from this MSW feedstock consisted of components present from air ($N_2$, $O_2$, $CO_2$, $H_2O$) in addition to hydrogen ($H_2$), carbon monoxide (CO), and some methane ($CH_4$). Based on GC-MS scans, a small amount of benzene also appeared to be present in the gas mix as well as very low levels of some organic hydrocarbons. Low levels of other volatile organics were observed by GCMS but not quantified. Hydrogen and methane ($CH_4$) were quantified using reference gases and showed that these samples contained significant amounts of hydrogen.

The MSW Ash was isolated and dried for particle size analysis. Optical and electron micrographs of the irregular ash particles were obtained. On average, the oblong particles were on the order of 15µ in diameter (Feret's Diameter).

Both thermal data and EDX data were also obtained on a portion of slurry filtered through a 0.45µ polycarbonate filter and dried under a heat lamp. Based on the EDX data, this ash sample appeared to be primarily comprised of metals typically found in stainless steel No heavy metals were detected in the ash sample. Because of the limited amount of ash, this sample was not analyzed by ICP-OES. The presence of some carbon in the ash solids suggested that a small amount of organic material or char is also present.

Slurry solids were also assayed by DSC-TGA under air atmosphere from room temperature to 800° C. at a heating rate of 10° C./min. The TGA data showed that the sample lost only about 9% of its mass upon heating. Based on the transition below 200° C., the prepared solids still appeared to contained ~1.35% moisture. An additional weight loss of about 7.30% was hypothesized to be organics which were oxidized or combusted above 250° C.

Two samples showed 0.13 and 0.12% $CH_4$ and 58.9 and 38.4% $H_2$ respectively.

Elemental compositions of the solids was as follows.

TABLE 2

Elemental Composition of Digested MSW solids

| Analyte (nm) | Conc. (ppm) |
|---|---|
| Ag 328.068 | <1 |
| Al 396.153 | 385 |
| As 188.979 | <2 |
| Au 242.795 | <1 |
| B 249.677 | 13.4 |
| Ba 493.408 | 138 |
| Be 313.107 | <1 |
| Bi 223.061 | <1 |
| Ca 317.933 | 10,237 |
| Cd 226.502 | <1 |
| Co 228.616 | <1 |
| Cr 205.560 | 8.80 |
| Cu 324.752 | 7.36 |
| Fe 238.204 | 220 |
| Ga 294.364 | <1 |
| Hg 194.168 | <1 |
| K 766.490 | 676 |
| Li 670.784 | <1 |
| Mg 280.273 | 248 |
| Mn 257.610 | 17.5 |
| Mo 202.031 | 1.16 |
| Na 589.592 | 190 |
| Ni 232.003 | 7.90 |
| P 178.221 | 421 |
| Pb 220.353 | <2 |
| Pd 340.458 | <1 |
| Pt 265.945 | <1 |
| S 181.975 | 236 |
| Sb 206.836 | 25.4 |
| Se 196.026 | <2 |
| Si 251.611 | 747 |
| Sn 189.927 | <2 |
| Sr 407.771 | 12.2 |
| Th 283.730 | <2 |
| Ti 334.940 | 173 |
| Tl 190.801 | <1 |
| U 385.958 | <2 |
| V 292.402 | <1 |
| W 239.708 | <1 |
| Zn 202.548 | 37.9 |
| Zr 343.823 | 5.86 |

Example 3

Two gas samples derived from 2 different sources, meat and corn cobs, were submitted for chemical characterization along with 2 ash suspensions which were analyzed for particle size and shape. Gas chromatography performed under various conditions and with various detectors was used to assay the permanent gases, hydrocarbons and other volatile compounds while microscopy was employed to examine residual ash. Slurries of the starting materials were also submitted and bomb calorimetry was used to determine the heat of combustion of the dried solids.

Permanent gases and other small molecules such as CO and $CH_4$ were determined by GCTCD (HP5890A, Supelco Carboxen 1000) and GC-FID (Shimadzu GC2010, J&W GS-GasPro). The Meat Gas and Corn Cob Gas were sampled with a gas-tight syringe and injected into the GC system. Chromatograms were compared to a standard gas mixtures (Scott Gas Mix #501697, MAP/Pro, Scott Gas Mix #501662) to identify the components based on retention time. To assay for other volatile organics the gas samples were assayed by GC-MS (Shimadzu QP2010S, Phenomenex ZB-624) in a similar fashion. Best matches to mass spectral libraries were reported.

A Leitz Laborlux S polarizing light microscope was used to examine the samples for image analysis. A few drops were placed on a microscope slide and then topped with a coverglass. The images were collected and archived using a JVC 3-CCD digital camera and PVR Plus software. Image J software (version 1.46p) was used to analyze the size and shape distributions of the samples. The images were converted to the binary format to provide suitable brightness to contrast ratios. The images for both samples were collected using the same magnification (260x).

Heat of combustion was determined using a Parr Adiabatic calorimeter with a double valve bomb. 0.5 to 1.0 g of dried solids were placed in the high-pressure steel bomb pressurized with 35 atm of oxygen. The bomb was submerged in an insulated well stirred container of water in an adiabatic calorimeter. Ignition was achieved using an incandescent iron wire. The temperature of the water was recorded prior to, during, and after ignition. The resulting change in temperature due to combustion of the fuse and sample is proportional to the heat of combustion of the sample and the calorimeter constant. The calorimeter constant was determined using a benzoic acid standard. Additional corrections were made, one for the heat contributed by the burning fuse, one for formation of sulfuric acid and one for formation of nitric acid. From the measured sample weight, the measured temperature rise, the fuse correction, the sulfuric acid correction, nitric acid correction and the calorimeter constant, the heat of combustion was determined.

Figure 3:
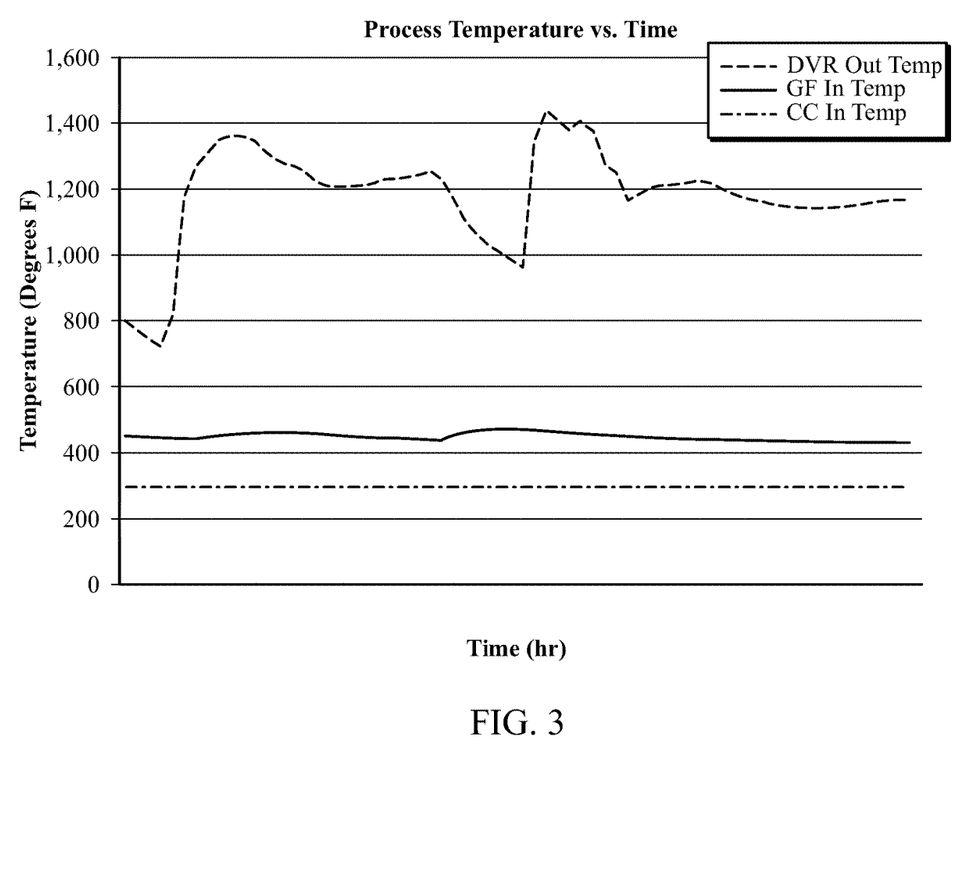
Figure 4:
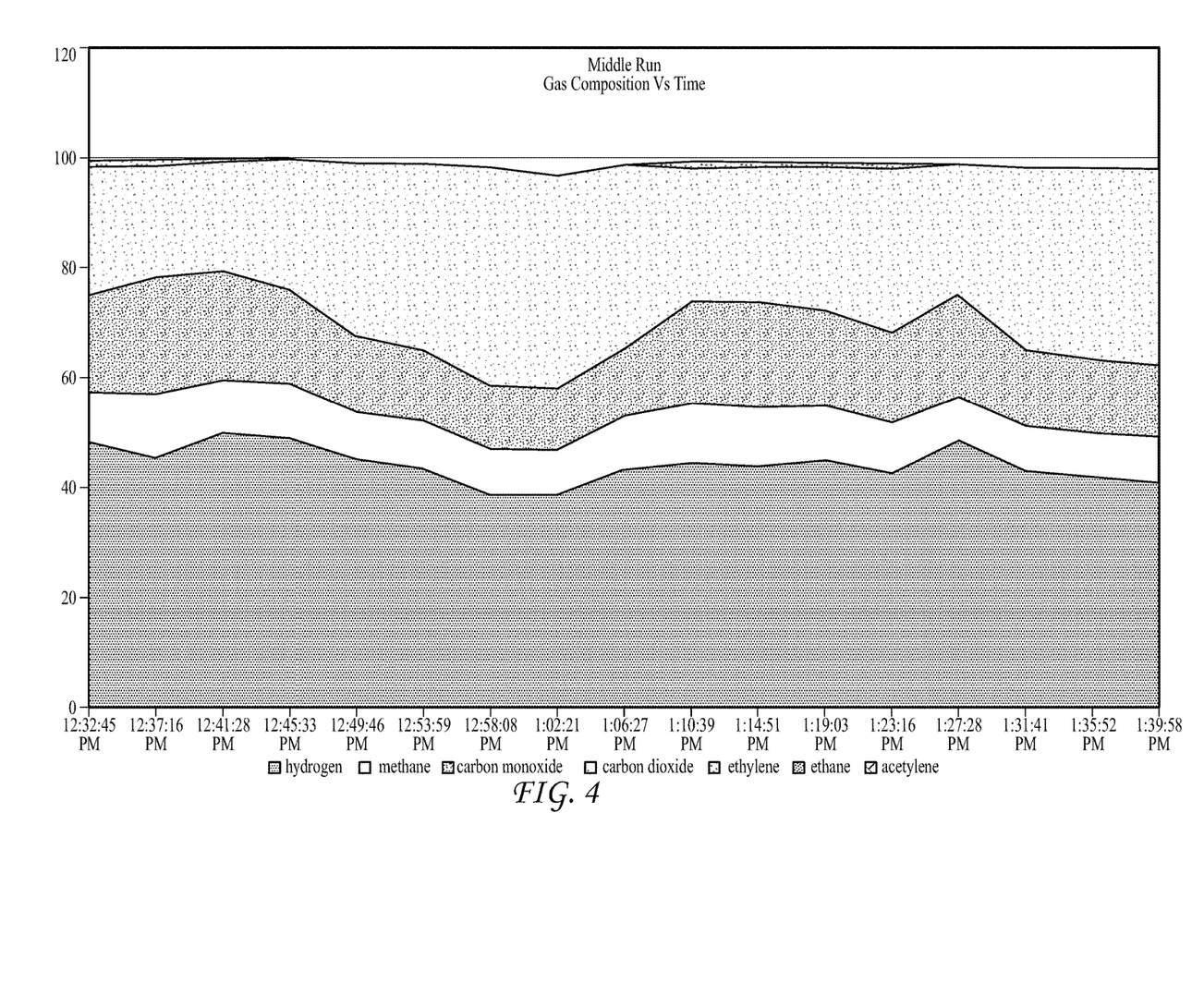
Figure 5:
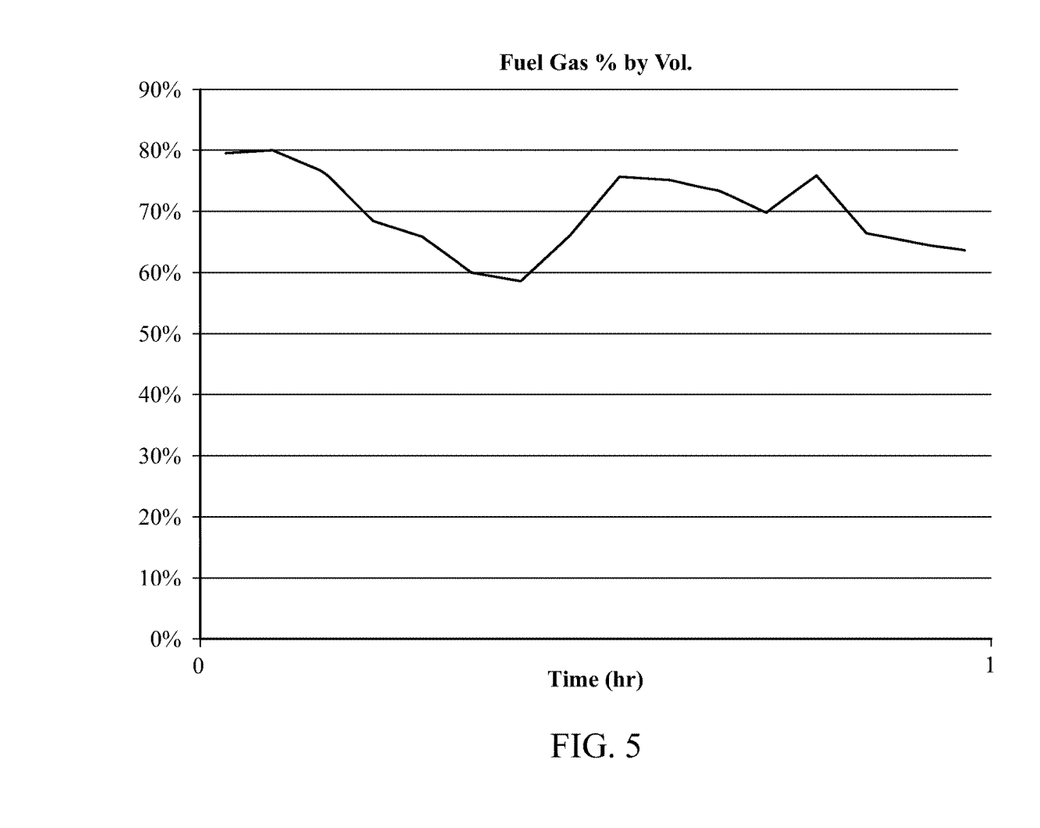

Based on these experiments, the heat of combustion for the dried meat solids, was 13,435 Btu/lb). Chemical components in the gas derived from meat consisted of components present from air in addition to several flammable hydrocarbons (FIGS. 3-5). Identified gases from the GC-MS data were based on the best match to mass spectral libraries. These included:
*$O_2$, $N_2$, CO, $CO_2$, $H_2O$
*$H_2$, $CH_4$ (methane), ethylene, acetylene
*vinyl acetylene, benzene, toluene.
Based on these experiments, the heat of combustion for the dried meat solids, was 8,044 Btu/lb)

Example 4

The methods of Example 3 were used except that corn cobs were used as the feedstock.

Chemical components in the gas derived from corn cobs consisted of components present from air in addition to several flammable hydrocarbons. Identified gases from the GC-MS data were based on the best match to mass spectral libraries. These included:
*$O_2$, $N_2$, CO, $CO_2$
*$H_2$, $CH_4$ (methane), ethylene, acetylene, propylene
*Nitrosomethane, methylene cyclopropane, 1,2 Dimethylcyclopropane, cyclopentadiene, hexene, cyclohexadiene, benzene, heptane, toluene.

Example 5

Flakes from a gasifier tube were characterized by energy dispersive X-ray microanalysis (EDX) and optical microcopy (OPMIC).

The flakes were dark grey in color and primarily comprised of metal oxides/hydroxides. Iron and oxygen were present in the highest concentrations while nickel, chromium and manganese were present in much lower concentrations.

A small flake was placed on a SEM mount topped with a conductive carbon tab. The elemental profile was determined at 20 kV. A JEOL JSM-6010LA scanning electron microscope equipped with a silicon-drift digital x-ray detector was used to collect the x-ray data. JEOL "In Touch Scope" software was used to collect and archive the resulting spectra.

Low magnification optical images were obtained using a Leica MZ12 stereo zoom microscope. Polarized light images were collected using a Leitz Laborlux S microscope. The images were collected and archived using a JVC 3-CCD camera and PVR Plus software.

The particles did not appear to be highly crystalline. In addition, the flake was composed primarily of iron and oxygen. Minor levels of nickel, chromium and manganese were observed. Carbon was present at a low level. The high level of oxygen suggested that the observed metals were present as oxides or hydroxides.

Example 5

Experimental

Production of syngas was produced from feedstock using an arrangement of process equipment as depicted in FIG. 1.

A micro-GC was calibrated to sense gasses which were expected in the fuel gas. The gas was sourced upstream of a meter and flare during the operation of the system. The outlet of the cooler/condenser is downstream of the gasifier.

The process temperature and pressure data was collected by a programmable logic controller which receives signals from temperature and pressure transmitters. These transmitters have been calibrated by the original manufacturer.

The feedstock utilized was cracked corn available typically as animal feed, which was mixed with water in 80% water slurry for feed into the system.

Results

The results show several facets of the operation which prove the efficacy of the system to convert material to synthetic fuel at a strong hydrogen fraction while maintaining a low carbon dioxide constituent. This balance of products is produced at a lower temperatures of operation that other technologies known in the field of the art. The lower temperature operation provides for obvious efficiencies in energy consumption of the system. Below is a description of the information of each of the charts in the attachments. FIGS. 2 to 6 and the description below reflect results from a one hour commercial scale run.

Process Pressure Vs. Time

Figure 2:
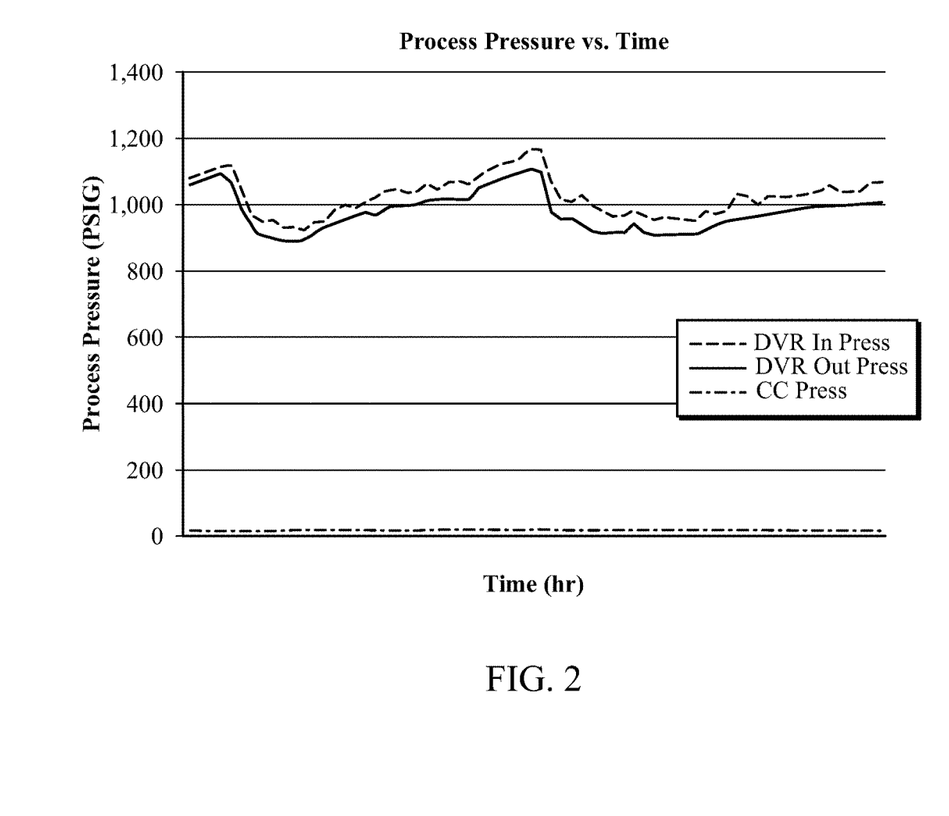

FIG. 2 shows the process pressures illustrating the pressure drop between the first reactor and the second reactor. The first reactor is the Devolitilization Reactor ("DVR") followed by the gasifier and the cooler/condenser ("CC"). The pressure readings were taken at the inlet and outlet of the DVR, and then at the inlet of the CC. As indicated there is a pressure drop from between 900-1150 psig between the gasifier and the condenser which operated at a pressure of around 15 psig.

Process Temperature Vs. Time

FIG. 3 illustrates an embodiment having certain operating temperatures. The temperatures are indicated from three key points. The first is the outlet temperature of the DVR, which is where substantial devolitilization occurs. This devolitilization occurred at less than 600° F. (316° C.), and test results showed that the material was, in fact, reduced significantly to char. The second temperature is the gasifier inlet temperature, which illustrates the pressure drop between the two reactors. This temperature reflects a significant temperature drop as water entrained in the process flashes to steam at the saturation pressure. The third temperature is taken from the gasifier outlet, or the condenser inlet temperature of the process flow. This shows that gasification occurred at between 900° F. (482° C.) and just over 1,400° F. (760° C.), illustrating the lower temperature advantage of the invention.

Gas Composition vs Time

FIG. 4 presents a stacked % volume (vol %) composition chart of the fuel gas. Of particular note is the high hydrogen fraction of between 40 and 50 vol % accompanied by a strong and stable methane fraction of over 10 vol %. Also of note is that the carbon dioxide fraction generally did not exceed 30 vol %.

Fuel Gas Percent by Volume

FIG. 5 illustrates gas quality in terms of efficacy. It illustrates the quality of fuel gasses with respect to inert components in the fuel such as nitrogen and carbon dioxide. This is important in comparison to other technologies in the field of the art in that most other technologies produce low-fraction fuel gasses whereas the GIPO process produces 60-80 vol % fuel gas composition.

HHV BTU/CF

Figure 6:
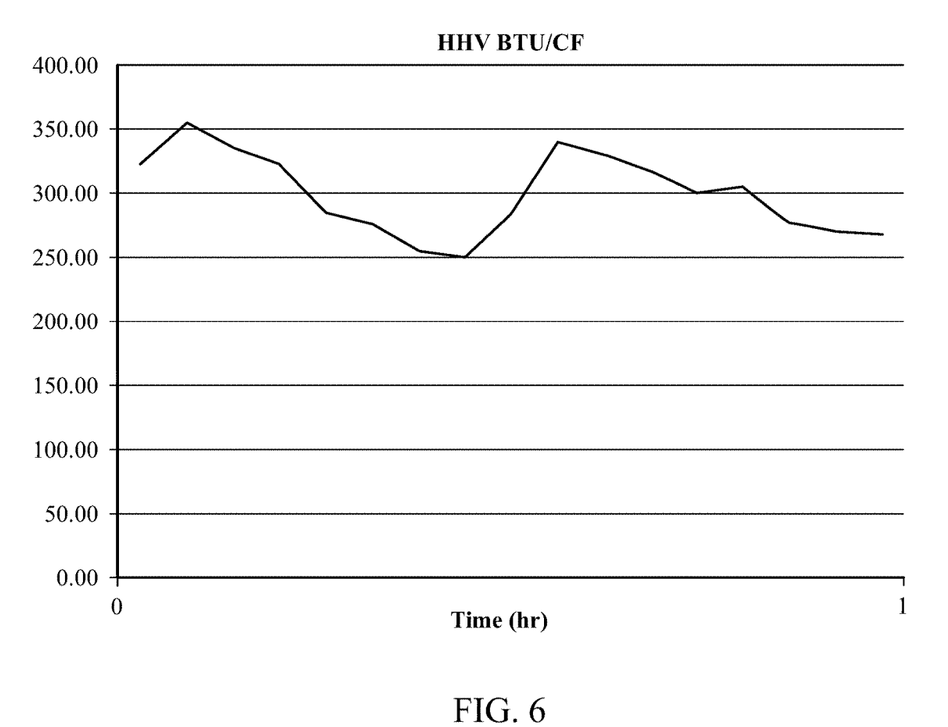

FIG. 6 shows the quality of the gas produced from a heating value perspective. The value of between 250-350 BTU/CF (British thermal units/cubic foot) is mainly driven by the high hydrogen fraction in the gas and is not indicative of poor efficiency. This can be seen again by the low carbon dioxide fraction. We have witnessed in other operations that the carbon dioxide fraction can be as low at 16 vol %.

What is claimed:

1. A method for converting carbonaceous feedstock slurry into synthetic fuel gas comprising:
    (a) introducing a carbonaceous feed stock slurry into a first reaction vessel via a continuous feed;
    (b) converting said carbonaceous feed stock slurry to a carbon char slurry comprising carbon char and water by allowing said carbonaceous feed stock slurry to have a residency time of between 5 and 30 minutes in said first reaction vessel, said carbonaceous feed stock slurry being heated to a temperature of between about 260 to about 320° C. at a pressure such that water does not flash to steam,
    (c) transferring said carbon char slurry comprising carbon char and water from the first reaction vessel to a second reaction vessel which comprises an entrained flow steam reforming gasifier, the entrained flow steam reforming gasifier being constructed of material comprising nickel, introducing a pressure decrease with said transferring such that at least a portion of the water flashes to steam to produce a carbon char slurry comprising carbon char and steam, and
    (d) within said second reaction vessel producing a mixture comprising synthetic fuel gas from said carbon char slurry comprising carbon char and steam, the gasifier producing a process bulk temperature within the gasifier from greater than 650° C. to about 1000° C.

2. The method of claim 1, wherein said first reaction vessel comprises a process entry point, a process exit point and tubing connecting said process entry point and said process exit point.

3. The method of claim 1, wherein the carbonaceous feed stock entering the second reaction vessel has an average particle size of 2-20 microns.

4. The method of claim 1, wherein the carbonaceous feed stock entering the second reaction vessel has an average particle size of 4-15 microns.

5. The method of claim 1, wherein the carbonaceous feed stock in the second reactor undergoes turbulent velocity flow.

6. The method of claim 1, wherein the process bulk temperature is at least 850° C.

7. The method of claim 1, wherein the process bulk temperature does not exceed 650° C.

8. The method of claim 1, wherein the process bulk temperature does not exceed 550° C.

9. The method of claim 1, wherein the process bulk temperature does not exceed 500° C.

10. The method of claim 1, wherein step (b) of claim 1 is performed at a temperature above 900 psia but does not exceed 1300 psia.

11. The method of claim 1, wherein said carbonaceous feed stock is derived from one or more of municipal waste, agricultural waste, and food waste.

12. The method of claim 11, wherein the carbonaceous feed stock comprises one or more of diapers, food, textiles, wood, yard waste, paper, and plastic.

13. The method of claim 11, wherein the carbonaceous feed stock comprises agricultural waste.

14. The method of claim 11, wherein the carbonaceous feed stock comprises food waste.

15. The method of claim 1, wherein the carbonaceous feed stock comprises contaminated soil.

16. The method of claim 1, wherein the carbonaceous feed stock comprises one or more fossil fuels.

17. The method of claim 1, wherein the carbonaceous feed stock comprises rubber.

18. The method of claim 17, wherein said rubber comprises one or more of tires and debris from tires.

19. The method of claim 1, wherein the carbonaceous feed stock comprises medical waste.

20. The method of claim 1, wherein the carbonaceous feed stock comprises hazardous chemical waste.

21. The method of claim 1, wherein the carbonaceous feed stock comprises contaminated aqueous waste.

22. The method of claim 1, wherein the carbonaceous feed stock comprises sewage.

23. The method of claim 1, wherein the carbonaceous feed stock comprises human cadavers.

24. The method of claim 1, wherein the carbonaceous feed stock comprise radioactive waste.

25. The method of claim 1, wherein said second reaction vessel additionally produces an ash comprising at least 20 ppm of each of Al, Ba, Ca, Fe, K, Mg, Na, P, S, Si, Ti and Zn.

26. The method of claim 25, wherein said ash additionally comprise at least 5 ppm of each of Cr, Cu, Ni, Sb and Zr.

27. A method for converting carbonaceous feedstock slurry into synthetic fuel gas comprising:
(a) introducing a carbonaceous feed stock slurry into a first reaction vessel via a continuous feed;
(b) converting said carbonaceous feed stock slurry to a carbon char slurry comprising carbon char, and water by allowing said carbonaceous feed stock slurry to have a residency time of between 5 and 30 minutes in said first reaction vessel, said carbonaceous feed stock slurry being heated to a temperature of between about 260 to about 320° C. at a pressure such that water does not flash to steam,
(c) transferring said carbon char slurry comprising carbon char and water from the first reaction vessel to a second reaction vessel which comprises an entrained flow steam reforming gasifier, introducing a pressure decrease with said transferring such that at least a portion of the water flashes to steam to produce a carbon char slurry comprising carbon char and steam, and
(d) within said second reaction vessel producing a mixture comprising synthetic fuel gas from said carbon char slurry comprising carbon char and steam, the gasifier producing a process bulk temperature within the gasifier not exceeding 650° C.

28. The method of claim 27, wherein said first reaction vessel comprises a process entry point, a process exit point and tubing connecting said process entry point and said process exit point.

29. The method of claim 27, wherein the entrained flow steam reforming gasifier is constructed of material comprising nickel.

30. The method of claim 27, wherein the carbonaceous feed stock entering the second reaction vessel has an average particle size of 2-20 microns.

31. The method of claim 27, wherein the carbonaceous feed stock entering the second reaction vessel has an average particle size of 4-15 microns.

32. The method of claim 27, wherein the carbonaceous feed stock in the second reactor undergoes turbulent velocity flow.

33. The method of claim 27, wherein the process bulk temperature does not exceed 550° C.

34. The method of claim 27, wherein the process bulk temperature does not exceed 500° C.

35. The method of claim 27, wherein said carbonaceous feed stock is derived from one or more of municipal waste, agricultural waste, and food waste.

36. The method of claim 35, wherein the carbonaceous feed stock comprises one or more of diapers, food, textiles, wood, yard waste, paper, and plastic.

37. The method of claim 35, wherein the carbonaceous feed stock comprises agricultural waste.

38. The method of claim 35, wherein the carbonaceous feed stock comprises food waste.

39. The method of claim 27, wherein the carbonaceous feed stock comprises contaminated soil.

40. The method of claim 27, wherein the carbonaceous feed stock comprises one or more fossil fuels.

41. The method of claim 27, wherein the carbonaceous feed stock comprises rubber.

42. The method of claim 41, wherein said rubber comprises one or more of tires and debris from tires.

43. The method of claim 27, wherein the carbonaceous feed stock comprises medical waste.

44. The method of claim 27, wherein the carbonaceous feed stock comprises hazardous chemical waste.

45. The method of claim 27, wherein the carbonaceous feed stock comprises contaminated aqueous waste.

46. The method of claim 27, wherein the carbonaceous feed stock comprises sewage.

47. The method of claim 27, wherein the carbonaceous feed stock comprises human cadavers.

48. The method of claim 27, wherein the carbonaceous feed stock comprise radioactive waste.

49. The method of claim 27, wherein said second reaction vessel additionally produces an ash comprising at least 20 ppm of each of Al, Ba, Ca, Fe, K, Mg, Na, P, S, Si, Ti and Zn.

50. The method of claim 49, wherein said ash additionally comprise at least 5 ppm of each of Cr, Cu, Ni, Sb and Zr.

* * * * *